United States Patent
Montúfar Chávez et al.

(10) Patent No.: US 11,655,049 B1
(45) Date of Patent: May 23, 2023

(54) DRONE BOX LANDING SYSTEM

(71) Applicants: Sergio Montúfar Chávez, San Antonio, TX (US); Gerardo Orozco, Scottsdale, AZ (US)

(72) Inventors: Sergio Montúfar Chávez, San Antonio, TX (US); Gerardo Orozco, Scottsdale, AZ (US)

( * ) Notice: Subject to any disclaimer, the term of this patent is extended or adjusted under 35 U.S.C. 154(b) by 0 days.

(21) Appl. No.: 17/404,781

(22) Filed: Aug. 17, 2021

Related U.S. Application Data

(60) Provisional application No. 63/066,702, filed on Aug. 17, 2020.

(51) Int. Cl.
*B64F 1/22* (2006.01)
*B64F 1/12* (2006.01)

(52) U.S. Cl.
CPC ............... *B64F 1/222* (2013.01); *B64F 1/12* (2013.01)

(58) Field of Classification Search
CPC .... B64F 1/12; B64F 1/122; B64F 1/24; B64F 3/00; B64C 2201/201
See application file for complete search history.

(56) References Cited

U.S. PATENT DOCUMENTS

| | | | | |
|---|---|---|---|---|
| 2014/0124621 | A1* | 5/2014 | Godzdanker | B64F 1/12 244/110 E |
| 2016/0257424 | A1* | 9/2016 | Stabler | B64F 1/20 |
| 2018/0148170 | A1* | 5/2018 | Stamatovski | B64F 1/222 |
| 2018/0245365 | A1* | 8/2018 | Wankewycz | H02J 7/00 |
| 2022/0019247 | A1* | 1/2022 | Dayan | B64F 1/222 |

* cited by examiner

*Primary Examiner* — Tye William Abell
(74) *Attorney, Agent, or Firm* — Plager Schack LLP; Mark H. Plager; Alexis J. Saenz

(57) ABSTRACT

A drone box landing system includes features for increasing drone docking capacity and positioning drones on the landing pad area. Some embodiments include a dual platform configuration which rotates one platform out of the way for another platform. In some applications, one drone may land on a first platform, be secured into place by an automatic positioning system, and the platform flipped over to reveal a second platform ready to receive a second drone. The positioning system is configured to make contact with a landed drone and guide the drone to a docking position in the landing pad area.

8 Claims, 6 Drawing Sheets

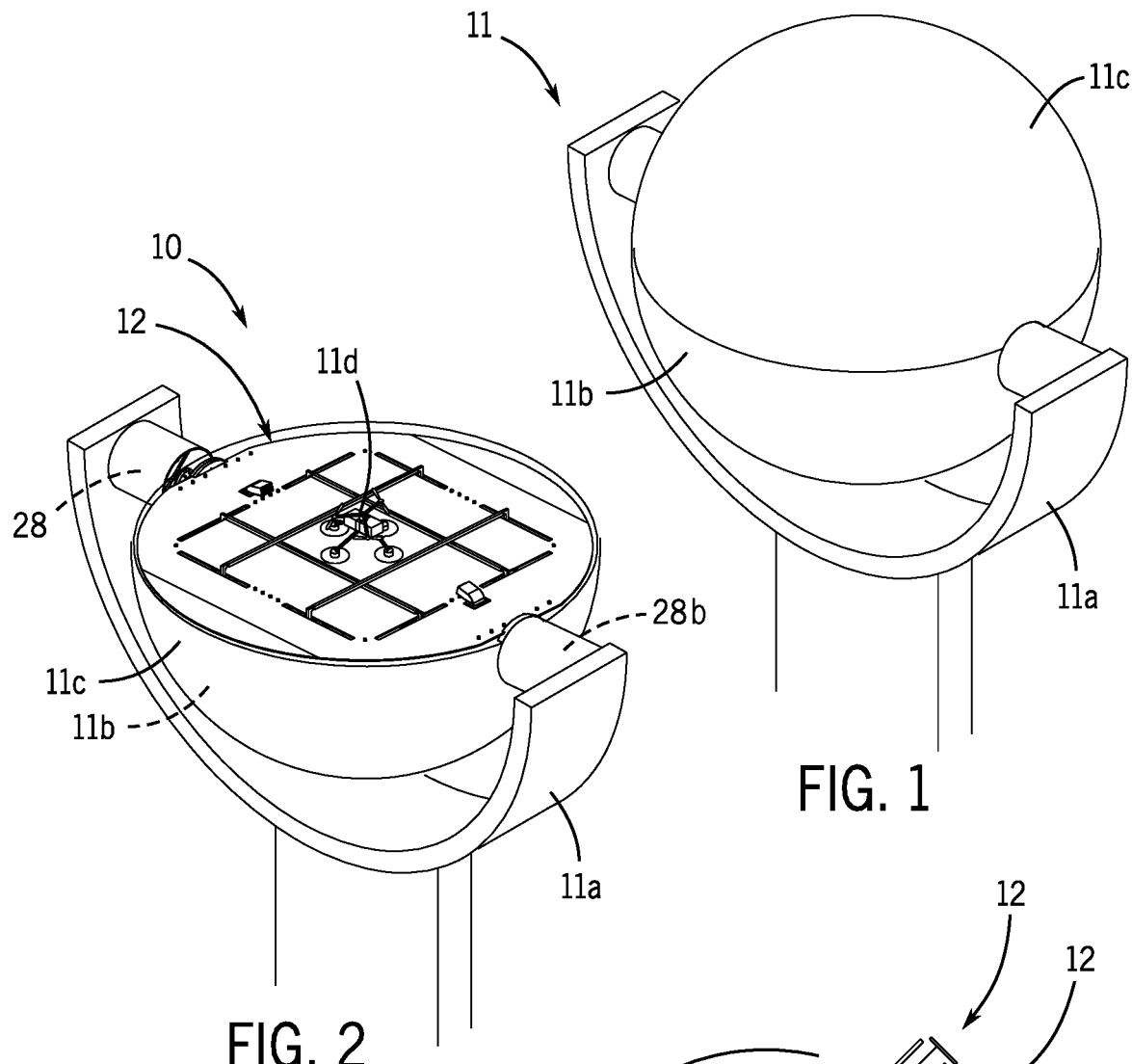
FIG. 1
FIG. 2
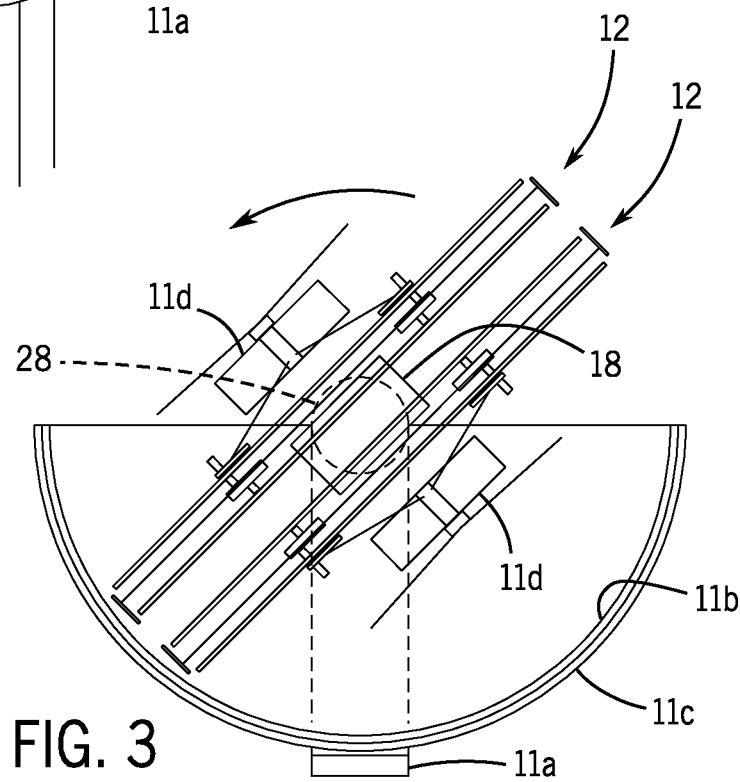
FIG. 3

DRONE BOX LANDING SYSTEM

CROSS-REFERENCE TO RELATED APPLICATIONS

This application claims priority to provisional patent application U.S. Ser. No. 63/066,702 filed on Aug. 17, 2020, the entire contents of which, including drawings and a specification are herein incorporated by reference.

BACKGROUND

The embodiments herein relate generally to unmanned vehicles and more particularly, to a drone box landing system.

Drones can be used for many applications, but their range and time of flight is always limited to the battery they carry. It is very practical to have a base, usually called drone box or drone-port, where the drone can automatically land, recharge and continue doing a task in an automated form without human interaction.

A drone port is usually composed of two parts: a charging pad, where the drone lands, and a box, that protects the drone from the environment and usually has additional functionalities depending on the application. Since the landing of the drone in a very precise spot is a challenge, the landing pads may be configured to allow the drone to land in a wider area. Some landing pads may include a centering mechanism to center the drone and be able to charge it via physical contacts.

Most of the drone box designs are squared (or rectangular) and may use multiple motors to open/close the box and for the landing pad operation. It is also common to have a mechanism to elevate the pad outside of the box, which adds even more motors. The most typical pad's configuration of drone boxes that center the drone have two arms configured to operate in a Cartesian coordinate system; two arms to operate movement in the x-axis and two for the y-axis. This way, it can center the drone in the center of the pad but using more than 1 motor, in this specific case, it usually uses four motors, four drives and at least 4 limit sensors.

There are several shortcomings with current, more complex, design. First, reliability depends on multiple servo motors. If each has a mean time between failures (MTBF) of X, more motors used means a higher MTBF and thus lower reliability. A second shortcoming is cost. The more motors, the more the cost of the product.

As can be seen there is a need for a system that addresses these shortcomings.

SUMMARY

In one aspect of the subject technology, a drone landing system is disclosed. The drone landing system comprises a platform. The platform includes a landing pad area, for a drone to land on. A motor is coupled to the platform. One or more guide devices are positioned on a perimeter of the platform. A mechanical driver is coupled to the motor and to the guide device. The mechanical driver is configured to move in a curved path, and translate a rotation of the motor to drive the guide device inward to contact the drone and move the drone into a docking position in the landing pad area.

In another aspect of the subject technology, a drone landing system comprises a first platform, including a first landing pad area, for a first drone to land on. The system also includes a second platform, including a second landing pad area, for a second drone to land on. The second landing pad area faces in a direction opposite from the first landing pad area. The system also includes a connection between the first platform and the second platform. A motor is coupled to the connection, so that the first platform and the second platform are rotatable by the motor.

BRIEF DESCRIPTION OF THE FIGURES

The detailed description of some embodiments of the invention is made below with reference to the accompanying figures, wherein like numerals represent corresponding parts of the figures.

FIG. 1 is a perspective top view of a closed drone box according to an embodiment of the subject technology.

FIG. 2 is a perspective top view of the drone box from FIG. 1, in an open position, according to an embodiment of the subject technology.

FIG. 3 is a cross-sectional side view of the drone box of FIG. 1 according to an embodiment of the subject technology.

DETAILED DESCRIPTION OF CERTAIN EMBODIMENTS

Figure 4:
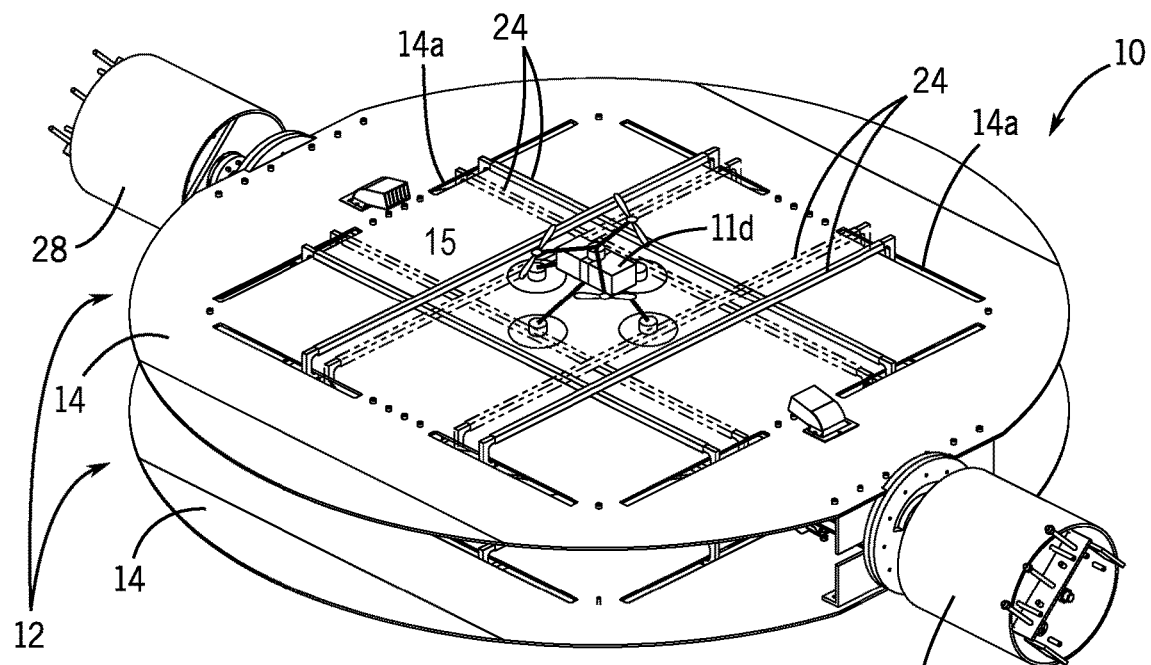
FIG. 4 is a perspective side view of a dual-sided landing pad detached from the drone box of FIG. 3 in accordance with an embodiment.
Figure 5A:
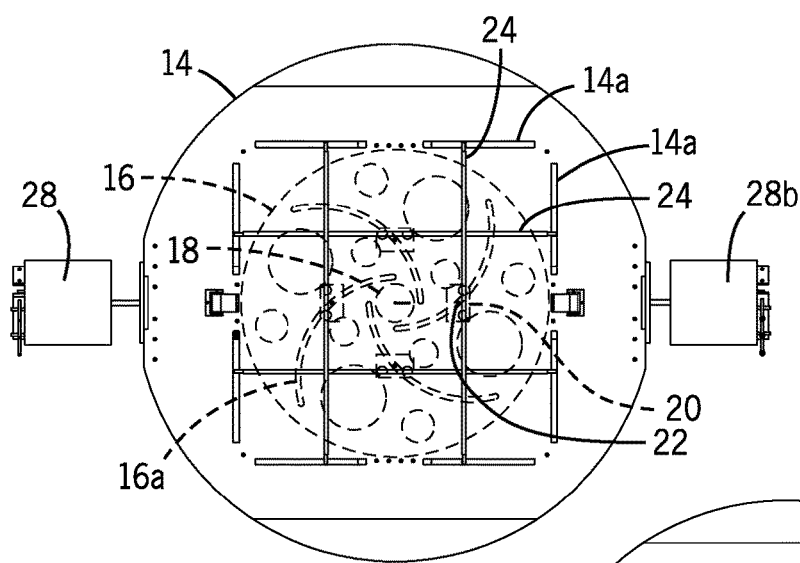
FIG. 5A is a top plan view of a landing pad and guide system for centering drones according to an embodiment of the subject technology.
Figure 5B:
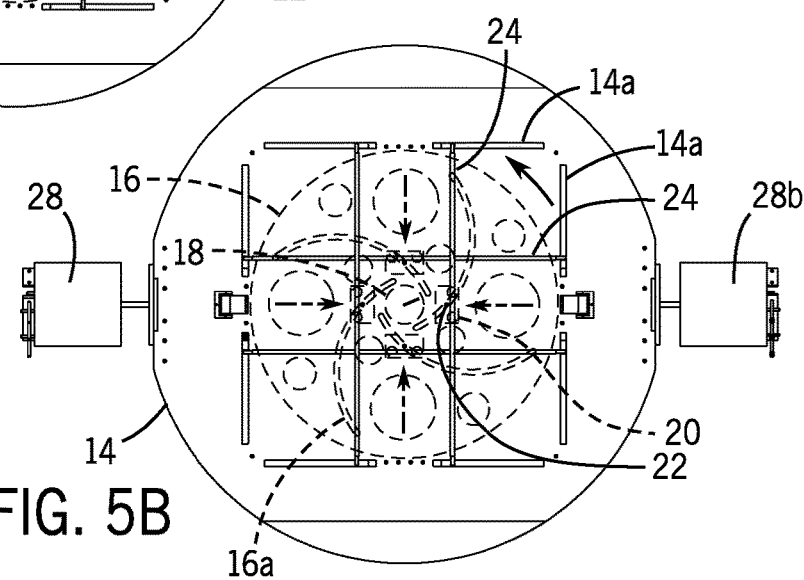
FIG. 5B is a top plan view of the landing pad of FIG. 5A with the guide system for centering drones in a (closed) position according to an embodiment of the subject technology.
Figure 6:
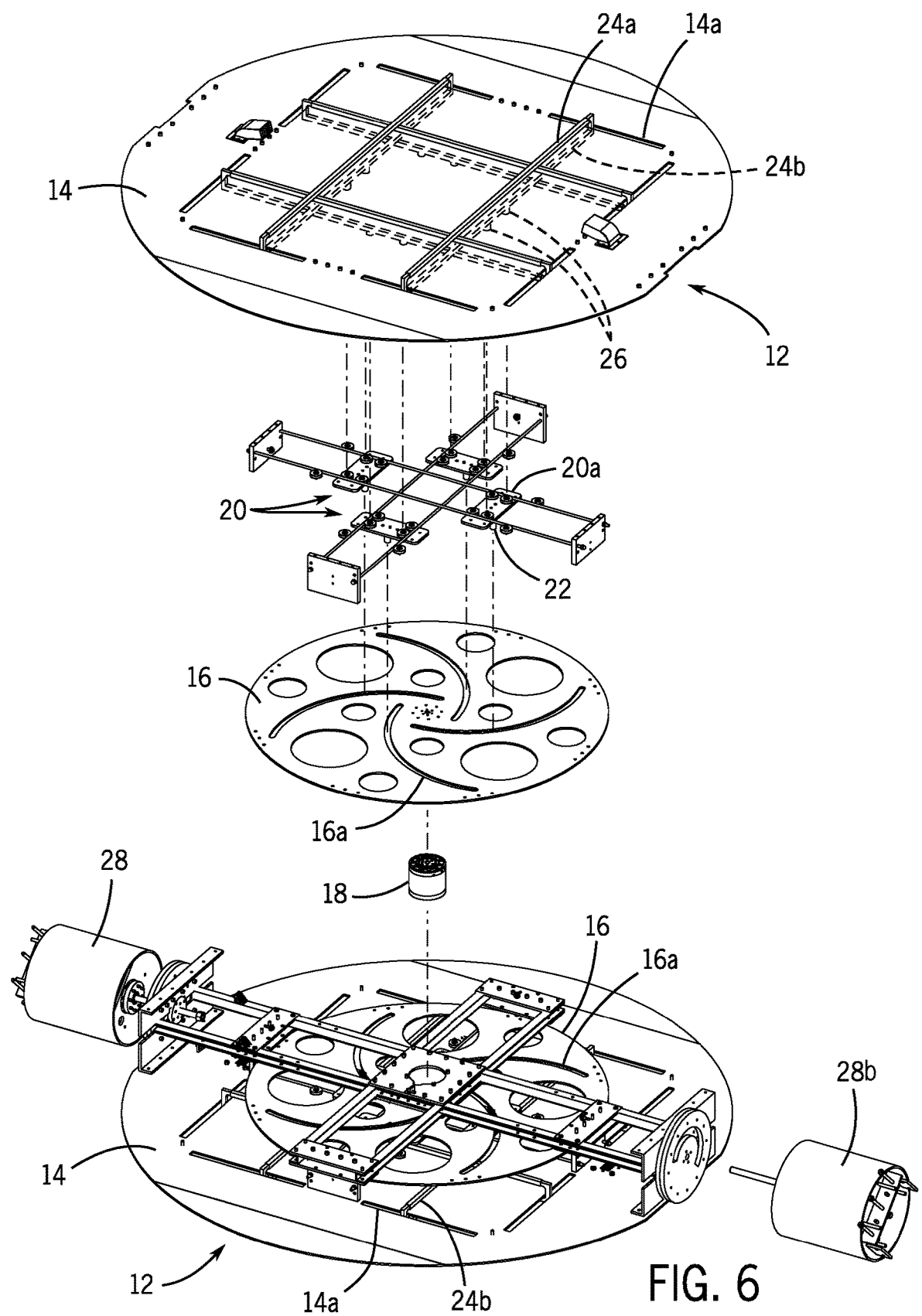
FIG. 6 is an exploded perspective view of the landing pad of FIG. 4 according to an embodiment of the subject technology.

In general, and referring to the Figures, embodiments of the disclosed subject technology provide a drone box with improved landing and storage capabilities. In one aspect, the drone box includes a structure that may need only a single motor to guide the unmanned autonomous vehicle (UAV) to a docked position. UAVs may sometimes be called "drones" and may be referred to interchangeably in this disclosure. In another aspect, one motor may be used to translate a rotational path, guiding rails or some other pushing mechanism to center a landed drone. In another aspect, the drone box system increases drone docking capacity and readiness for dispatch.

As will be appreciated, embodiments of the subject technology that are able to use less motors than previous systems reduce the mean time between failures (MTBF) and thus, less motors means higher reliability in drone docking systems. In another aspect, some embodiments may include structure that provides docking and storage of multiple UAVs. While one UAV is docked and may be recharging, the landing platform may be configured to move and receive another UAV while safely putting the first docked UAV out of the way of the second incoming UAV.

Referring now to FIGS. 1-7, a drone box system 10 (sometimes referred to as the "system 10") is shown according to an exemplary embodiment. In some embodiments, as shown in FIG. 1-3, the drone box system 10 may include a dome housing 11. The dome housing 11 may be coupled to a foundation 11a. The foundation 11a may include a semicircular mount with the dome housing 11 coupled to opposite ends of the mount. Embodiments may include a motor 28 in one or both connections between the foundation mount and the dome housing 11. The dome housing 11 may include a stationary bottom half shell 11b. In some embodiments, the bottom half shell 11b is fixed in place and does not move. An upper half shell 11c may be movable so that it rotates and slides outside and around the bottom half shell 11b when switching from a closed to open position. In some embodiments, one of the motors may be a motor 28b coupled to the upper half shell 11c to open and close the shell. In the open position, a landing pad system 12 is exposed.

Referring now to FIGS. 2-4, details of the landing pad system 12 are shown according to exemplary embodiments. In an exemplary embodiment, the landing pad system 12 may include dual landing platforms 14 that are one on top of the other. Embodiments may include a charging pad 15 (or other charging connection element) proximate the center of one or both landing platforms 14. While embodiments show the charging pad 15 near the center, it will be understood that the charging pad 15 may be located in other places of the landing platform 14 and the drone positioning features may be adjusted to position the position or dock the drone onto one or more locations around the platform 14 as needed. Motor 28 may be coupled to an axle of the landing pad system 12 to rotate the platforms around the axis of the connection to the foundation 11a. A drone 11d may land on the platform that is facing upward. A second drone 11d may have previously landed and once secured in place onto its respective platform, was rotated out of the way facing downward while the other platform faced upward. As may be appreciated, the previously docked drone 11d may have been charging or being loaded/unloaded with cargo while rotated out of the landing side of the system 12. The opposing platform was then free to accept docking of a second drone 11d. Once the second drone 11d was secured into a docked position, the platforms may be rotated again positioning the first drone 11d back on the upper half facing open space and ready for dispatch. The second drone 11d may be rotated into the closed space within the dome shell 11b.

As will be appreciated, the drone box system 10 may be configured to rotate the landing platform system 10 to dock multiple UAVs. The platform assembly may be flipped over to uncover a second landing pad system on opposite the first landing pad system. As may be appreciated, the flippable platform provides many applications. When the landing pad is rotatable 180 degrees, a first UAV may be docked to charge while the system awaits a second UAV to land. This allows for example, increased storage capability in the same drone box. In addition, a standby drone becomes available to continue the mission of a battery depleted drone with little downtime. It should also be appreciated, that the pusher guides allow the first docked UAV to be held in place by press fit pressure while the UAV is flipped upside down.

Referring now to FIGS. 4, 5A, 5B, 6, and 7, the landing pad system 12 is shown in more detail according to an exemplary embodiment. As described previously, some embodiments include dual landing pad platforms 14. For sake of illustration, this aspect of the system 10 will be described based on a single platform 14 with the understanding that embodiments may include one or more platforms 14 that operate the same.

A platform 14 may be configured for centering or repositioning a drone 11d into a docking position. In some embodiments, the docking position may be off-center of the platform 14 and the positioning system may be adapted accordingly. However, in the example, shown, the positioning system is configured for centering the drone 11d. The platform 14 may include structure that pushes or moves the drone 11d into the center. For example, guides 24 are generally positioned near the perimeter of the platform 14 when the positioning system is in a default state to allow space for the drone 11d to land. The guides 24 may be movable inward from the perimeter so that the guides maker contact with the drone 11d. In some embodiments, the system may include a controller (not shown) which automatically drives the guides 24 upon detection of a drone landing. The guides 24 move until the drone is detected as located in its docking position. In an exemplary embodiment, the guides 24 may be rails that define a generally square configuration in the default, open state. In a closed, docking position state, the guides 24 may define an octothorpe or hash symbol with the rails intersecting each other and the drone 11d within the center of the octothorpe.

Figure 7:
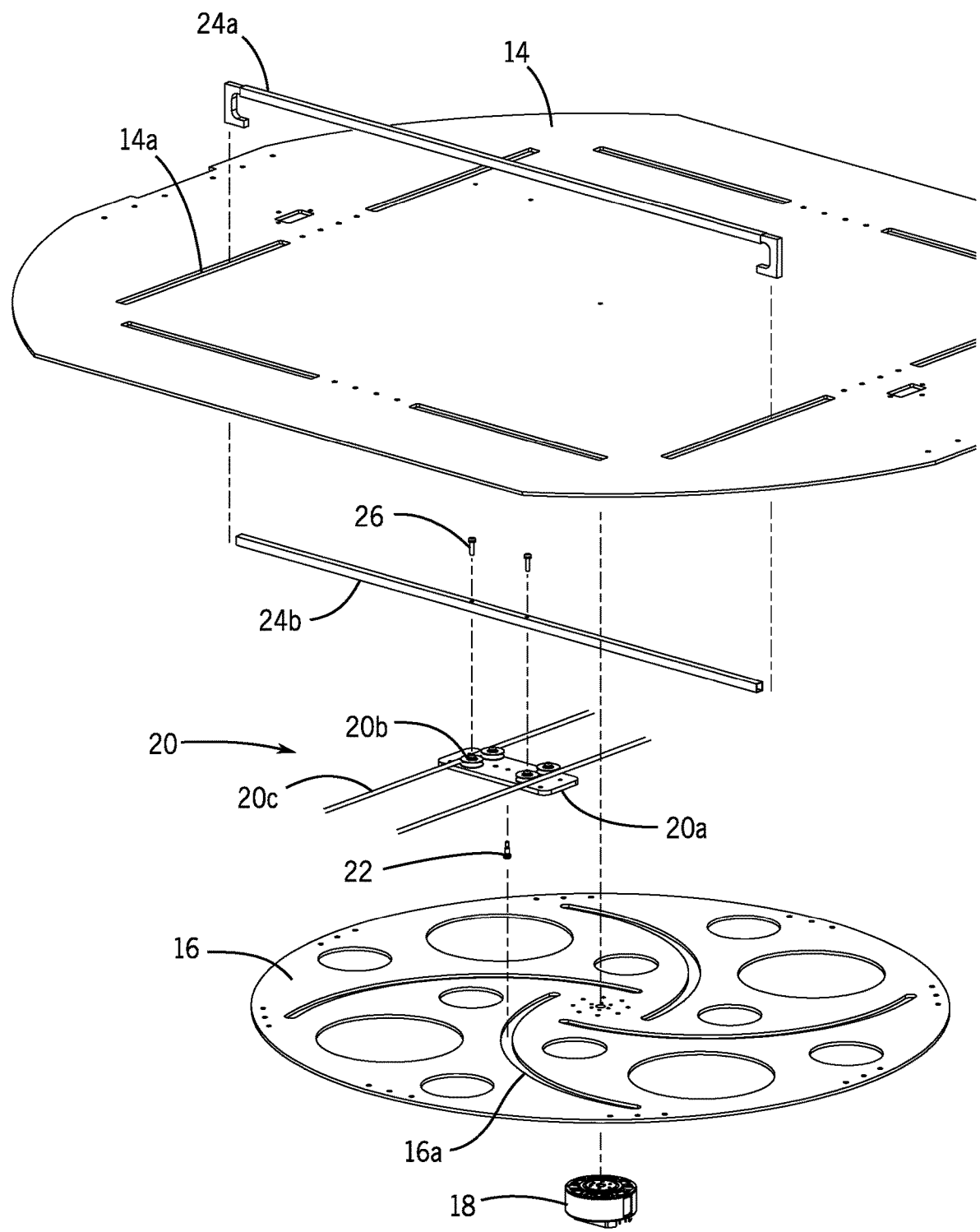
FIG. 7 is an enlarged perspective exploded view of the guide system connected to an underlying radial and spiral slot combination for the guiding drones into a centered position according to an embodiment of the subject technology.

The platform 14 may include a channel or slot 14a within which the rails travel. As shown in FIG. 7, a rail may comprise an upper bar 24a (above the platform 14) and a lower 24b (below the platform 14) that connect together so that the platform 14 is between the upper bar 24a and lower bar 24b. One pair of rails may be elevated slightly above the other pair so that as the rails move inward, the rails do not interfere with each other while making contact with the drone 11d. The rails may be coupled to a drive carrier assembly 20 which may be positioned under the platform 14. The drive carrier assembly 20 may include a carrier plate 20a, a pulley system 20b, and a pair of guide wires 20c.

In an exemplary embodiment, the positioning system translates a rotational path into the movement of the guides 24 to encounter and position the drone 11d. A central drive motor 18 may drive the multiple guides 24. The central drive motor 18 may be positioned centrally under the platform 14. The central drive motor 18 may be coupled to the subject platform 14 on one output end of the motor and simultaneously be coupled to the opposing platform 14 providing the driving force for positioning drones 11d on both platforms respectively. See FIG. 6 which shows a single motor 18 between the two platforms 14. During operation of the positioning system, the carrier plate 20a carries the guide 24. In some embodiments, the drive motor 18 operates one platform's positioning system independently of the other platform's positioning system.

In an exemplary embodiment, the positioning system includes a drive plate 16 coupled to the motor 18. The drive plate 16 includes curvilinear or spiral channels 16a disposed to translate a rotational movement of the plate 16 into linear movement which guides the rails uniformly toward the center of the platform 14. A drive pin 22 may be positioned within each curvilinear channel 16a. The drive pin 22 may include a head that prevents the pin from falling out of the channel 16a. The drive pin 22 may be coupled to the lower bar 24b through carrier plate 20a. The lower bar 24b may be attached to the carrier plate 20a by one or more fasteners 26. In operation, as the motor 18 is driven, the plate 16 is rotated. The rotation of the plate 16 forces the drive pins 22 to follow their respective channels 16a at a uniform rate. As the drive pins 22 move inward/outward along their respective channels 16a, the carrier plates 20a for each respective rail are pulled inward/outward by translation of the curvilinear path into linear movement along the pulleys 20b and guide wires 20c.

Figure 8:
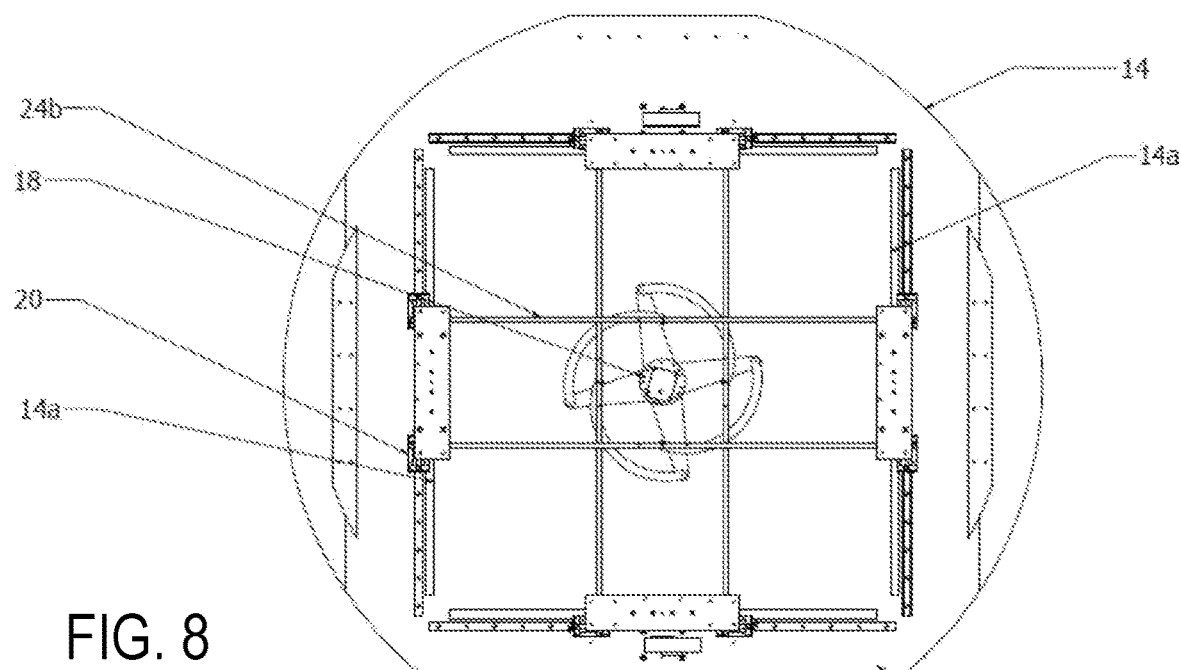
FIG. 8 is a bottom view of the landing pad and centering guide system with a guide mechanism in a fully retracted position.
Figure 9:
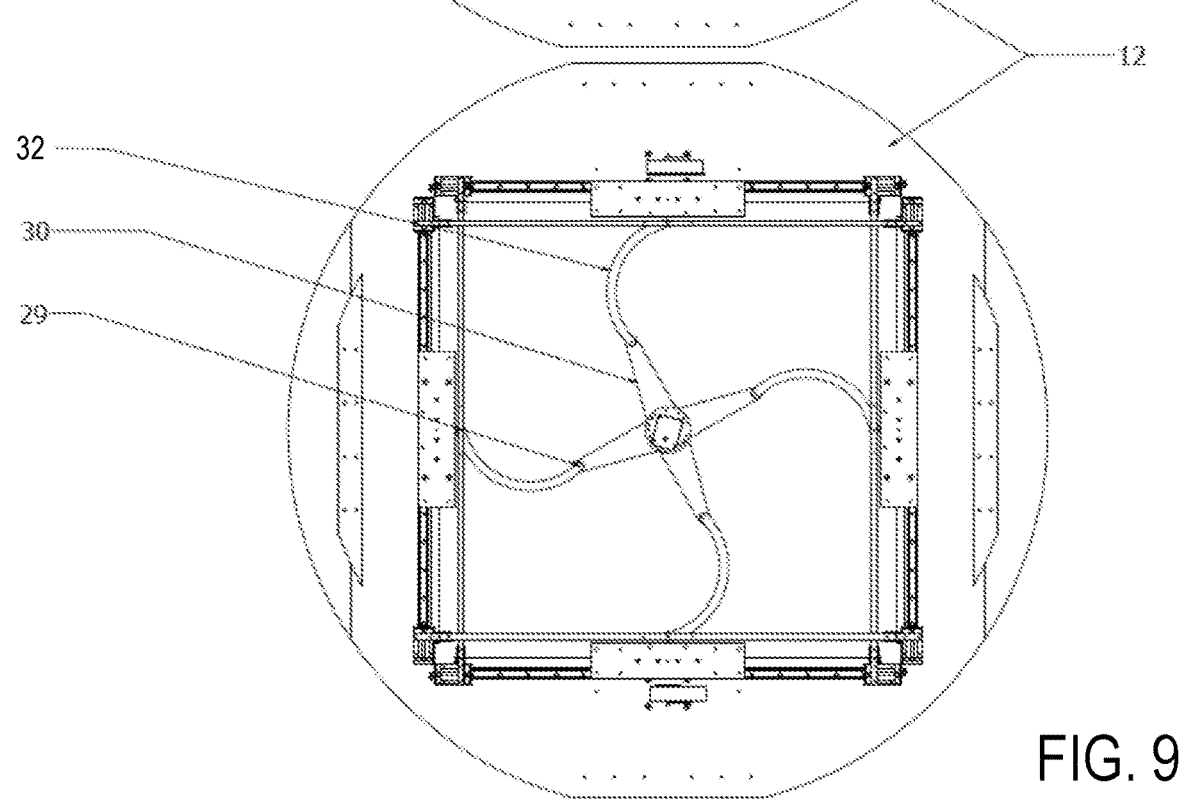
FIG. 9 is a bottom view of the landing pad and centering guide system of FIG. 8 with the guide mechanism in a fully expanded position.
Figure 10:
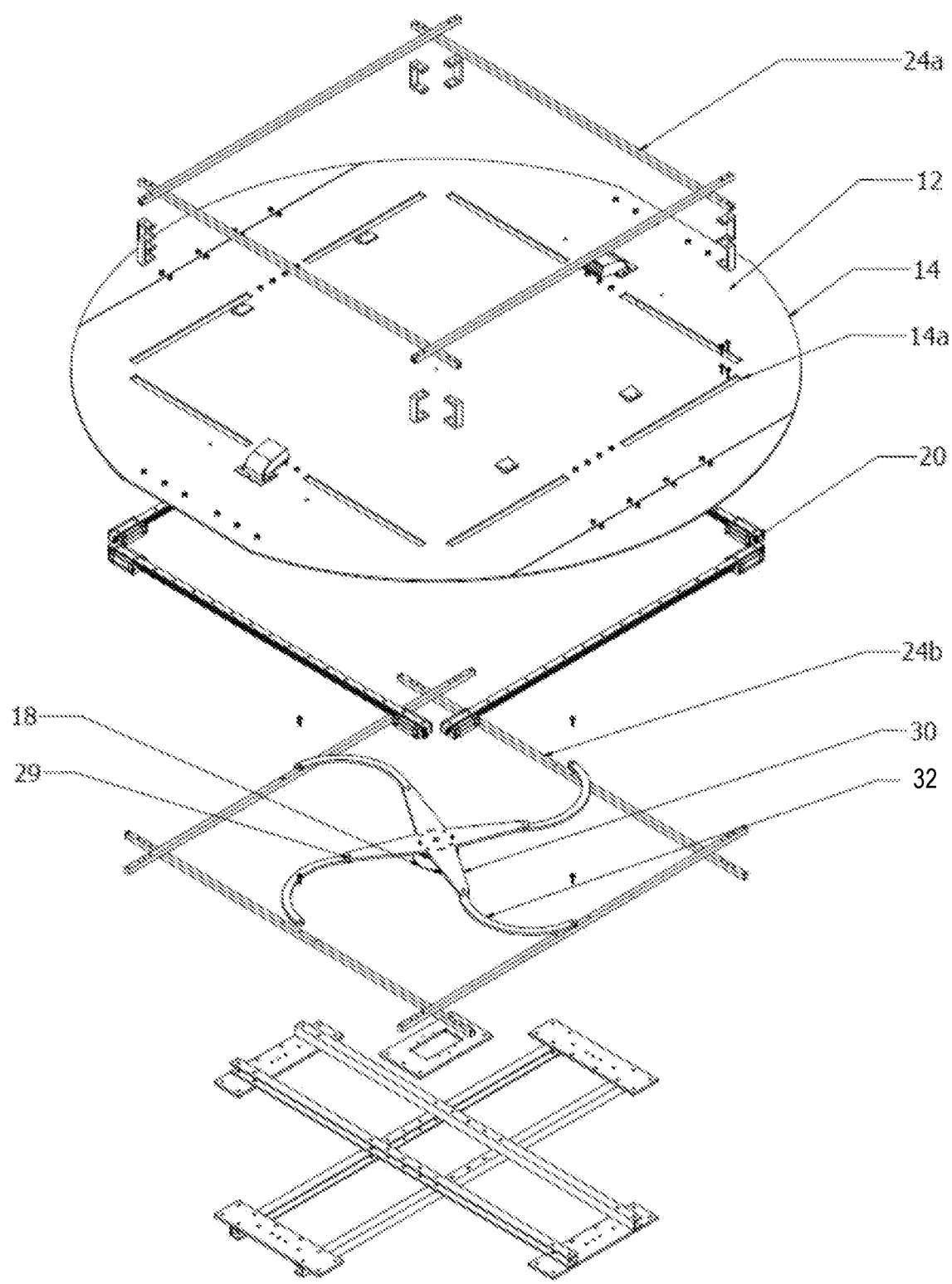
FIG. 10 is an exploded top perspective view of a landing pad and centering guided system according to another embodiment of the subject technology.

FIGS. 8-10 show an alternate embodiment of the platform 14 assembly comprising an alternate positioning mechanism. The embodiment shown in FIGS. 8-10 is similar to the embodiment shown in FIGS. 1-7 except that instead of a drive plate 16, retractable arms 30 are coupled to the guides 24. The arms 30 may be fully extended in the default state. A curved outer portion 32 of an arm 30 may be coupled to a fixed inner portion of the arm at a pivot point 29. A distal end of each curved arm portion may be coupled to respective guides 24 via carrier assemblies 20. As the drive motor 18 turns, the curved portion 32 of the arms 30 translate rotation inward by hinging at the pivot point until each arm collapses inward toward the center of the platform 14. The carrier assemblies translate that rotational movement linearly in toward the center of the platform 14 so that the rails move inward uniformly contacting the drone 11d and moving the drone into the center of the guides 24 when the arms 30 are fully retracted.

Since the mechanical design disclosed utilizes only one motor to open and close the dome compartment and only one motor to center the drone inside the box, the MTBF is extended to the MTBF of the motors. If the comparison is done from a one motor design to a 4 motor design, the MTBF is cut in 4. The motors are a significant percentage of the total cost of goods sold or COGS. Reducing the number of motors, then also reduces the total COGS. Carrying two drones on the same design improves throughput and performance (range) of any drone mission.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A drone landing system, comprising:
   a first platform, including a first landing pad area, for a drone to land on and linear channels;
   a motor coupled to the first platform;
   one or more guide devices positioned on a perimeter of the first platform;
   a mechanical driver coupled to the motor and to the one or more guide devices, wherein:
   the mechanical driver includes:
      a rotatable guide plate coupled to the motor, wherein the guide plate includes curvilinear channels, and
      a drive pin positioned in respective curvilinear channels of the guide plate; and
      the one or more guide devices are opposing sets rails positioned within the linear channels and connected to respective drive pins, wherein the rails are configured to move linearly inward to a center of the first platform in a response to the drive pins travelling within the curvilinear channels, and
   the mechanical driver is configured to move in a curved path, and translate a rotation of the motor to drive the one or more guide devices inward to contact the drone and move the drone into a docking position in the first landing pad area.

2. The drone landing system of claim 1, wherein the opposing sets of rails are arranged in a square in the default state and move into an octothorpe as the rails move linearly inward toward the center of the first platform.

3. The drone landing system of claim 1, further comprising:
   a second platform, including a second landing pad area, coupled to the motor, wherein:
   the first platform and the second platform are arranged in a platform assembly,
   the first landing pad area of the first platform faces outward in an opposite direction from the second landing pad area of the second platform,
   the platform assembly is rotatable around an axis between the first platform and the second platform to reposition the first landing pad area or the second landing pad area into disposition to receive the drone.

4. The drone landing system of claim 3, wherein the second platform includes a second mechanical driver and a second guide device to position the drone in the second landing pad area.

5. The drone landing system of claim 4, wherein the motor includes a first output end coupled to the first platform and a second output end coupled to the second platform, wherein the first output end is configured to move independently of the second output end.

6. A drone landing system, comprising:
   a first platform, including a first landing pad area, for a drone to land on;
   a motor coupled to the first platform;
   a second platform, including a second landing pad area, coupled to the motor, wherein:
   the first platform and the second platform are arranged in a platform assembly,
   the first landing pad area of the first platform faces outward in an opposite direction from the second landing pad area of the second platform,
   the platform assembly is rotatable around an axis between the first platform and the second platform to reposition the first landing pad area or the second landing pad area into disposition to receive the drone;
   one or more guide devices positioned on a perimeter of the first platform; and
   a mechanical driver coupled to the motor and to the one or more guide devices, wherein the mechanical driver is configured to move in a curved path, and translate a rotation of the motor to drive the one or more guide devices inward to contact the drone and move the drone into a docking position in the first landing pad area.

7. The drone landing system of claim 6, wherein the second platform includes a second mechanical driver and a second guide device to position the drone in the second landing pad area.

8. The drone landing system of claim 7, wherein the motor includes a first output end coupled to the first platform and a second output end coupled to the second platform, wherein the first output end is configured to move independently of the second output end.

* * * * *